(12) United States Patent
Vick et al.

(10) Patent No.: US 8,799,693 B2
(45) Date of Patent: Aug. 5, 2014

(54) DYNAMIC POWER OPTIMIZATION FOR COMPUTING DEVICES

(75) Inventors: Christopher A. Vick, San Jose, CA (US); Gregory M. Wright, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 13/303,871

(22) Filed: Nov. 23, 2011

(65) Prior Publication Data

US 2013/0073883 A1 Mar. 21, 2013

Related U.S. Application Data

(60) Provisional application No. 61/536,684, filed on Sep. 20, 2011.

(51) Int. Cl.
  *G06F 1/26* (2006.01)
  *G06F 1/32* (2006.01)
  *G06F 1/00* (2006.01)
  *G06F 9/45* (2006.01)

(52) U.S. Cl.
  CPC ........................... *G06F 1/32* (2013.01); *G06F 1/3212* (2013.01)
  USPC ............ 713/320; 713/300; 717/140; 717/151

(58) Field of Classification Search
  USPC ........................... 713/300, 320; 717/140, 151
  See application file for complete search history.

(56) References Cited

U.S. PATENT DOCUMENTS

| | | | |
|---|---|---|---|
| 5,790,874 A * | 8/1998 | Takano et al. ................. | 713/320 |
| 6,301,674 B1 | 10/2001 | Saito et al. | |
| 6,457,082 B1 * | 9/2002 | Zhang et al. .................. | 710/260 |
| 6,618,042 B1 * | 9/2003 | Powell .......................... | 345/204 |
| 6,684,390 B1 | 1/2004 | Goff | |
| 7,124,283 B2 | 10/2006 | Yamada et al. | |

(Continued)

FOREIGN PATENT DOCUMENTS

| CN | 101923492 A | 12/2010 |
|---|---|---|
| EP | 0926596 A2 | 6/1999 |

(Continued)

OTHER PUBLICATIONS

Zheng, H.; Liu, K.J.R., "Power optimized space-time code for layer coded multimedia over wireless channels," Image Processing, 1999. ICIP 99. Proceedings. 1999 International Conference on, vol. 3, pp. 95,99, 1999.*

(Continued)

*Primary Examiner* — Faisal M Zaman
(74) *Attorney, Agent, or Firm* — Nicholas A. Cole

(57) ABSTRACT

In the various aspects, virtualization techniques may be used to reduce the amount of power consumed by execution of applications by power-optimizing the code prior to execution. A dynamic binary translator operating at the machine layer may use a power consumption model to identify code segments that can benefit from optimization and to perform an instruction-sequence to instruction-sequence translation of object code to generate power-optimized object code. Execution hardware may be instrumented with additional circuitry to measure the power consumption characteristics of executing code. The power consumption models may be updated and object code may be regenerated based on the measured the power consumption characteristics of previously executed code. In an aspect, power optimization may be accomplished when the computing device is connected to a battery charger.

38 Claims, 12 Drawing Sheets

(56) References Cited

U.S. PATENT DOCUMENTS

| | | | |
|---|---|---|---|
| 7,146,613 B2 | 12/2006 | Chauvel et al. | |
| 7,234,126 B2 | 6/2007 | Catthoor et al. | |
| 7,243,243 B2 | 7/2007 | Gedeon | |
| 7,386,844 B2 * | 6/2008 | Heishi et al. | 717/161 |
| 7,389,403 B1 * | 6/2008 | Alpert et al. | 712/10 |
| 7,596,430 B2 | 9/2009 | Aguilar, Jr. et al. | |
| 7,694,306 B2 | 4/2010 | Minor | |
| 7,730,340 B2 | 6/2010 | Hu et al. | |
| 7,739,530 B2 * | 6/2010 | Takayama et al. | 713/320 |
| 7,770,034 B2 | 8/2010 | Nanja | |
| 7,802,241 B2 * | 9/2010 | Roy et al. | 717/151 |
| 7,836,321 B2 | 11/2010 | Aaltonen et al. | |
| 7,873,814 B1 * | 1/2011 | Cohen et al. | 712/209 |
| 7,904,893 B2 * | 3/2011 | Munter et al. | 717/148 |
| 8,074,093 B1 * | 12/2011 | Johnson | 713/322 |
| 8,108,850 B2 * | 1/2012 | Chang et al. | 717/156 |
| 8,146,064 B2 * | 3/2012 | Chen et al. | 717/141 |
| 8,595,520 B2 | 11/2013 | Li et al. | |
| 8,634,302 B2 | 1/2014 | Khawer et al. | |
| 8,683,243 B2 | 3/2014 | Wu et al. | |
| 2004/0010783 A1 * | 1/2004 | Moritz et al. | 717/151 |
| 2004/0054937 A1 | 3/2004 | Williams et al. | |
| 2004/0111715 A1 | 6/2004 | Stone | |
| 2005/0046467 A1 | 3/2005 | Kase et al. | |
| 2005/0088155 A1 | 4/2005 | Osburn et al. | |
| 2006/0095902 A1 | 5/2006 | Nakaike et al. | |
| 2006/0146056 A1 * | 7/2006 | Wyatt | 345/501 |
| 2006/0212677 A1 | 9/2006 | Fossum | |
| 2006/0224904 A1 * | 10/2006 | Zimmer et al. | 713/300 |
| 2007/0074011 A1 | 3/2007 | Borkar et al. | |
| 2007/0174828 A1 | 7/2007 | O'brien et al. | |
| 2007/0226686 A1 * | 9/2007 | Beardslee et al. | 717/109 |
| 2008/0126764 A1 * | 5/2008 | Wu et al. | 712/226 |
| 2008/0160977 A1 | 7/2008 | Ahmaniemi et al. | |
| 2008/0168287 A1 | 7/2008 | Berry et al. | |
| 2008/0301474 A1 | 12/2008 | Bussa et al. | |
| 2009/0089767 A1 * | 4/2009 | Daynes et al. | 717/148 |
| 2009/0158248 A1 | 6/2009 | Linderman et al. | |
| 2009/0241122 A1 | 9/2009 | Wong | |
| 2009/0300394 A1 * | 12/2009 | Archer et al. | 713/324 |
| 2009/0320003 A1 * | 12/2009 | Barsness et al. | 717/146 |
| 2010/0153954 A1 | 6/2010 | Morrow et al. | |
| 2010/0216490 A1 | 8/2010 | Linden | |
| 2011/0088021 A1 * | 4/2011 | Kruglick | 717/149 |
| 2011/0093733 A1 | 4/2011 | Kruglick | |
| 2011/0153307 A1 * | 6/2011 | Winkel et al. | 703/26 |
| 2011/0154309 A1 | 6/2011 | Sazegari et al. | |
| 2011/0211036 A1 * | 9/2011 | Tran | 348/14.08 |
| 2011/0271170 A1 * | 11/2011 | Walker | 714/819 |
| 2011/0296149 A1 * | 12/2011 | Carter et al. | 712/229 |
| 2011/0320766 A1 * | 12/2011 | Wu et al. | 712/28 |
| 2013/0080805 A1 | 3/2013 | Vick et al. | |
| 2013/0185581 A1 | 7/2013 | Michalak et al. | |
| 2014/0019723 A1 | 1/2014 | Yamada et al. | |

FOREIGN PATENT DOCUMENTS

| | | | | |
|---|---|---|---|---|
| EP | 2317729 A1 | | 5/2011 | |
| JP | 09251076 A | * | 9/1997 | G01S 13/75 |
| KR | 20080095443 A | * | 10/2008 | H04B 1/40 |
| WO | 0248837 A2 | | 6/2002 | |

OTHER PUBLICATIONS

Ahmad, I., "Power and visual quality optimized video coding for mobile applications: Research issues and some solutions," Multimedia and Expo, 2009. ICME 2009. IEEE International Conference on, pp. 1588,1589, Jun. 28, 2009-Jul. 3, 2009.*

Masselos, K.; Catthoor, F.; Goutis, C.E.; DeMan, H., "A performance-oriented use methodology of power optimizing code transformations for multimedia applications realized on programmable multimedia processors," Signal Processing Systems, 1999. SiPS 99. 1999 IEEE Workshop on, pp. 261,270, 1999.*

Abousleman, G.P., "Channel-optimized video coding for low-power wireless applications," Applied Imagery Pattern Recognition Workshop, AIPR 2001 30th, pp. 163,168, Oct. 1-12, 2001.*

Singh K., et al., "Real time power estimation and thread scheduling via performance counters", Computer Architecture News ACM USA, vol. 37, No. 2, May 2009, pp. 46-55, XP002694998, ISSN: 0163-5964.

Teodorescu R., et al., "Variation-aware application scheduling and power management for chip multiprocessors", Computer Architecture News ACM USA, vol. 36, No. 3, Jun. 2008, pp. 363-374, XP002694999, ISSN: 0163-5964.

International Search Report and Written Opinion—PCT/US2012/053341—ISA/EPO—Dec. 17, 2012.

Wu Y., et al., "A HW/SW co-designed heterogeneous multi-core virtual machine for energy-efficient general purpose computing", Code Generation and Optimization (CGO), 2011 9th Annual IEEE/ACM International Symposium on, IEEE, Apr. 2, 2011, pp. 236-245, XP031863949, DOI: 10.1109/CGO.2011.5764691 ISBN: 978-1-61284-356-8.

* cited by examiner

DYNAMIC POWER OPTIMIZATION FOR COMPUTING DEVICES

RELATED APPLICATIONS

This application claims the benefit of priority to U.S. Provisional Application No. 61/536,684, entitled "Dynamic Power Optimization For Computing Devices" filed Sep. 20, 2011, the entire contents of which are hereby incorporated by reference.

This application is also related to U.S. patent application Ser. No. 13/303,841 entitled "Dynamic Partitioning for Heterogeneous Cores" filed Nov. 23, 2011.

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful than ever. Mobile device users now routinely execute multiple complex and power intensive software applications and services on their mobile devices, all without a wired connection to a power source. As a result, a mobile device's battery life and power consumption characteristics are becoming ever more important considerations for consumers of mobile devices.

Increased battery life maximizes the user's experience by allowing users to do more with a wireless device for longer periods of time. To maximize battery life, mobile devices typically attempt to optimize mobile device power consumption using dynamic voltage and frequency scaling techniques. These techniques allow programmable device pipelines to run in a lower power and/or lower performance mode when non-critical applications or low load conditions are detected. For example, a mobile device may be configured to place one or more processors and/or resources in a low power state when idle. While these techniques may improve the overall battery performance, they require that device processors and/or resources be placed in an idle state and cannot improve the power consumption characteristics of individual applications or processes executing on the device. Thus, existing techniques attempt to tailor the behavior of the mobile device to the software applications running on the device, instead of tailoring the applications to consume less energy on the device. Since many modern software applications require power intensive processing, reducing the power consumption of the processes executing on the device, without altering the performance of the processes, will greatly enhance the user experience.

SUMMARY

The various aspects include methods of optimizing object code for power savings during execution on a computing device, including receiving compiled binary object code in system software, analyzing the received object code in a dynamic binary translator process operating at the machine layer to identify code segments that can be optimized for power savings, performing in the dynamic binary translator process an instruction-sequence to instruction-sequence translation of the received object code to generate power optimized object code, and executing the power optimized object code on a processor of the computing device. In an aspect, the system software which receives the compiled binary object code is one of a system virtual machine or a hypervisor. In an aspect, the system software which receives the compiled binary object code is an operating system. In an aspect, performing in the dynamic binary translator process an instruction-sequence to instruction-sequence translation of the received object code to generate power optimized object code includes translating a first instruction set architecture into a second instruction set architecture. In an aspect, the first instruction set architecture is the same as the second instruction set architecture. In an aspect, analyzing the received object code in a dynamic binary translator process operating at the machine layer to identify code segments that can be optimized for power savings includes determining whether there are alternative operations that achieve the same results as the identified object code operations, and performing in the dynamic binary translator process an instruction-sequence to instruction-sequence translation of the received object code to generate power optimized object code includes replacing, during translation, the identified object code operations with the alternative operations. In an aspect, the method further includes sensing a connection to a new power source. In an aspect, performing in the dynamic binary translator process an instruction-sequence to instruction-sequence translation of the received object code to generate power optimized object code is performed when connection to the new power source is detected. In an aspect, analyzing the received object code includes using a power consumption model to identify segments of object code that can be optimized for power efficiency. In an aspect, the method further includes measuring an amount of power consumed in the execution of segments of power optimized object code, comparing the measured amount of power consumed to predictions of the power consumption model, and modifying the power consumption model based on a result of the comparison.

Further aspects include a computing device configured to optimize object code during execution for improved power savings, including means for receiving in an compiled binary object code in system software, means for analyzing the received object code in a dynamic binary translator process operating at the machine layer to identify code segments that can be optimized for power savings, means for performing in the dynamic binary translator process an instruction-sequence to instruction-sequence translation of the received object code to generate power optimized object code, and means for executing the power optimized object code on a processor of the computing device. In an aspect, means for performing in the dynamic binary translator process an instruction-sequence to instruction-sequence translation of the received object code to generate power optimized object code includes means for translating a first instruction set architecture into a second instruction set architecture. In an aspect, means for translating a first instruction set architecture into a second instruction set architecture includes means for translating the first instruction set architecture into an instruction set architecture that is the same as the second instruction set architecture. In an aspect, means for analyzing the received object code in a dynamic binary translator process operating at the machine layer to identify code segments that can be optimized for power savings includes means for determining whether there are alternative operations that achieve the same results as the identified object code operations. In an aspect, means for performing in the dynamic binary translator process an instruction-sequence to instruction-sequence translation of the received object code to generate power optimized object code includes means for replacing, during translation, the identified object code operations with the alternative operations. In an aspect, the computing device further includes means for sensing a connection to a new power source. In an aspect, means for performing in the dynamic binary translator process an instruction-sequence to instruction-sequence translation of the received object code to generate power optimized object code includes means for translating the received code to generate power optimized object code when connection to the new power source is sensed. In an aspect, means for analyzing the received object code includes means for using a power consumption model to identify segments of object code that can be optimized for power efficiency. In an aspect, the computing device further includes means for measuring an amount of power consumed in the execution of segments of power optimized object code, means for comparing the measured amount of power consumed to predictions of the power consumption model, and means for modifying the power consumption model based on a result of the comparison.

Further aspects include a computing device that includes a memory and a processor coupled to the memory, in which the processor is configured with processor-executable instructions to perform operations including receiving compiled binary object code in system software, analyzing the received object code in a dynamic binary translator process operating at the machine layer to identify code segments that can be optimized for power savings, performing in the dynamic binary translator process an instruction-sequence to instruction-sequence translation of the received object code to generate power optimized object code, and executing the power optimized object code on a processor of the computing device. In an aspect, the stored processor-executable software instructions are configured to cause a processor to perform operations such that performing in the dynamic binary translator process an instruction-sequence to instruction-sequence translation of the received object code to generate power optimized object code includes translating a first instruction set architecture into a second instruction set architecture. In an aspect, the stored processor-executable software instructions are configured to cause a processor to perform operations such that the first instruction set architecture is the same instruction set architecture as the second instruction set architecture.

In an aspect the stored processor-executable software instructions are configured to cause a processor to perform operations such that analyzing the received object code in a dynamic binary translator process operating at the machine layer to identify code segments that can be optimized for power savings includes determining whether there are alternative operations that achieve the same results as the identified object code operations, and performing in the dynamic binary translator process an instruction-sequence to instruction-sequence translation of the received object code to generate power optimized object code includes replacing, during translation, the identified object code operations with the alternative operations. In an aspect the stored processor-executable software instructions are configured to cause a processor to perform operations including sensing a connection to a new power source. In an aspect the stored processor-executable software instructions are configured to cause a processor to perform operations such that performing in the dynamic binary translator process an instruction-sequence to instruction-sequence translation of the received object code to generate power optimized object code is performed when connection to the new power source is sensed. In an aspect, the stored processor-executable software instructions are configured to cause a processor to perform operations such that analyzing the received object code includes using a power consumption model to identify segments of object code that can be optimized for power efficiency. In an aspect, the stored processor-executable software instructions are configured to cause a processor to perform operations further includes measuring an amount of power consumed in the execution of segments of power optimized object code, comparing the measured amount of power consumed to predictions of the power consumption model, and modifying the power consumption model based on a result of the comparison.

Further aspects include a non-transitory processor-readable storage medium having stored thereon processor-executable software instructions configured to cause a processor to perform operations for optimizing object code for power savings during execution on a computing device, the operations including receiving compiled binary object code in system software, analyzing the received object code in a dynamic binary translator process operating at the machine layer to identify code segments that can be optimized for power savings, performing in the dynamic binary translator process an instruction-sequence to instruction-sequence translation of the received object code to generate power optimized object code, and executing the power optimized object code on a processor of the computing device. In an aspect, the stored processor-executable software instructions are configured to cause a processor to perform operations such that performing in the dynamic binary translator process an instruction-sequence to instruction-sequence translation of the received object code to generate power optimized object code includes translating a first instruction set architecture into a second instruction set architecture. In an aspect, the stored processor-executable software instructions are configured to cause a processor to perform operations such that the first instruction set architecture is the same instruction set architecture as the second instruction set architecture. In an aspect, the stored processor-executable software instructions are configured to cause a processor to perform operations such that analyzing the received object code in a dynamic binary translator process operating at the machine layer to identify code segments that can be optimized for power savings includes determining whether there are alternative operations that achieve the same results as the identified object code operations. In an aspect, the stored processor-executable software instructions are further configured to cause a processor to perform operations such that performing in the dynamic binary translator process an instruction-sequence to instruction-sequence translation of the received object code to generate power optimized object code includes replacing, during translation, the identified object code operations with the alternative operations. In an aspect, the stored processor-executable software instructions are configured to cause a processor to perform operations including sensing a connection to a new power source, In an aspect, the stored processor-executable software instructions are further configured to cause a processor to perform operations such that performing in the dynamic binary translator process an instruction-sequence to instruction-sequence translation of the received object code to generate power optimized object code is performed when connection to the new power source is sensed. In an aspect, the stored processor-executable software instructions are configured to cause a processor to perform operations such that analyzing the received object code includes using a power consumption model to identify segments of object code that can be optimized for power efficiency. In an aspect, the stored processor-executable software instructions are configured to cause a processor to perform operations further including measuring an amount of power consumed in the execution of segments of power optimized object code, comparing the measured amount of power consumed to predictions of the power consumption model, and modifying the power consumption model based on a result of the comparison.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
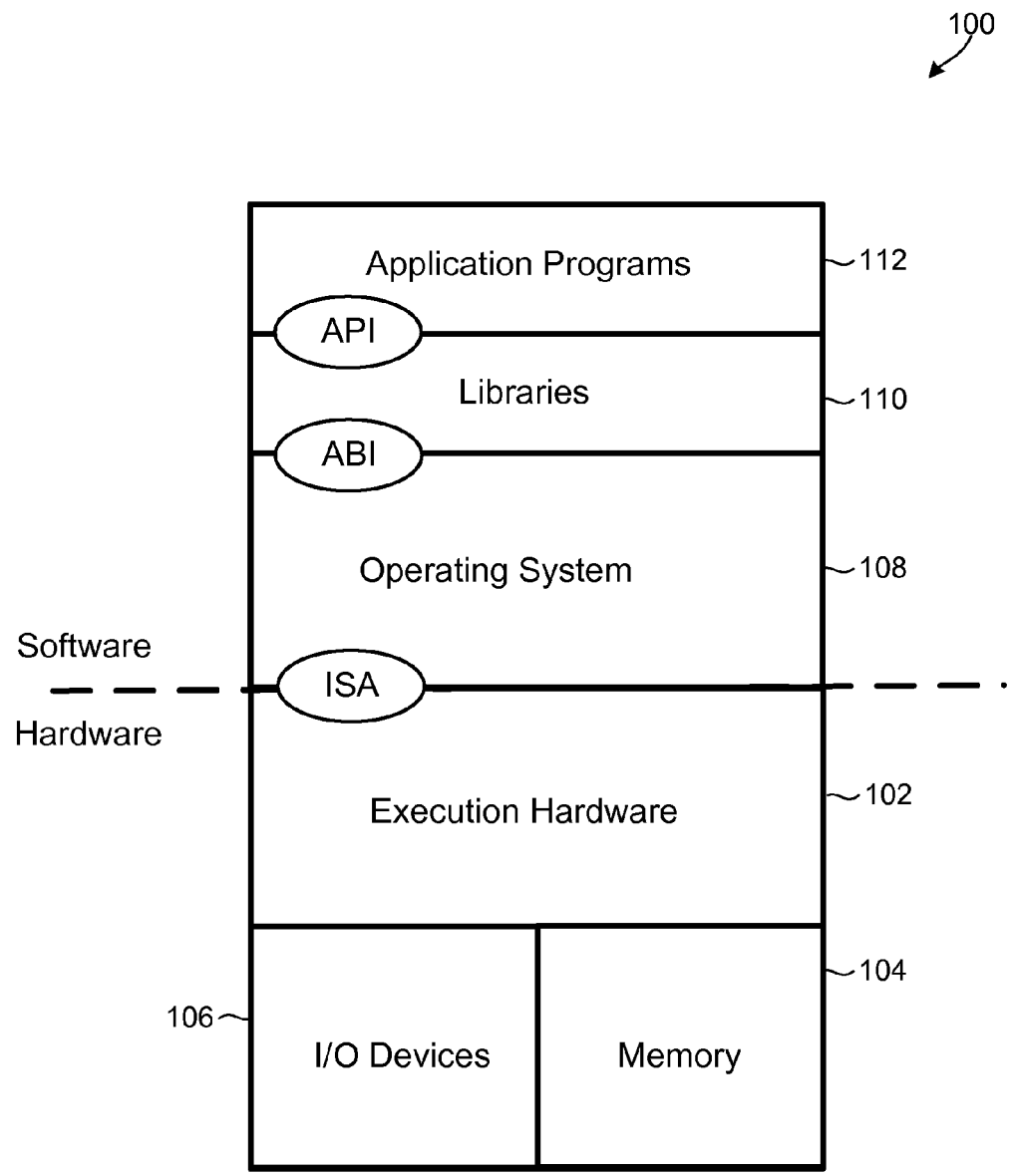
FIG. 1 is a layered computer architectural diagram illustrating logical components and interfaces in a computing system suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device" and "computing device" are used interchangeably herein to refer to any one or all of cellular telephones, personal data assistants (PDA's), palmtop computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, and similar personal electronic devices which include a programmable processor and operate under battery power such that power conservation methods are of benefit.

The term "resource" is used herein to refer to any of a wide variety of circuits (e.g., ports, clocks, buses, oscillators, etc.), components (e.g., memory), signals (e.g., clock signals), functions, and voltage sources (e.g., voltage rails), which may be used to support processors and clients running on a computing device.

As discussed above, existing techniques for increasing battery life generally place one or more processors and/or resources in a low power state. These techniques require the device processors/resources to be placed in an idle or low frequency state, and do not change the code executed by the applications/processes.

The various aspects provide methods, systems, and devices that use virtualization techniques that may be implemented within a hypervisor layer to reduce the amount of power consumed by active processors/resources. In a first aspect, a virtual machine receives object code for execution, analyzes the object code to recognize operations and parameters characterizing the operations to be performed by the device processors, and performs binary to binary translations to transform or translate the object code into new object code that can function more efficiently on the hardware of the specific mobile device. This recognition and transformation of object code may be accomplished according to a device specific model. Using a model that is associated with the processor architecture of a given mobile device, the virtual machine may determine that executing the object code on a particular hardware device may be power intensive. The virtual machine may then translate the binary object code to a different second object binary code having different operators (e.g., shift and add operations vs. multiplication operations) in order to save power. Thus, using a direct binary to binary translation, the information of the code may be preserved while the total amount of energy expended to process the object code may be reduced.

In a second aspect, the model of energy consumption by object code and the translations made to optimize code are updated based upon measurements of the actual power consumed by previously optimized object code. In this manner, the actual performance of the mobile device processors can be used to optimize the object code rather than relying upon a fixed model that may not reflect lot-to-lot variability in processor performance. In this aspect, the various processors on the computing device, such as the central processor unit, modem processors, and a GPS receiver processor (to name a few), may be instrumented to measure the power consumed during execution of object code. To enable tracking power consumption to particular object code optimization transformations, chunks or related pieces of object code are tagged when they are optimized and transformed. When the code is run by a processor, the measured power consumption associated with the code tag, and the measurement is compared to a performance prediction model as shown in the following figure. The comparison between the actual power consumption and the predicted performance is then fed back to the optimization process so that better optimization methods can be identified or used for subsequent object code optimizations. Object code then may be re-optimized by the virtual machine as described above, such as the next time the application is executed on the mobile device.

Generally, virtualization techniques are implemented in a virtual machine (VM), which is a software application that executes application programs like a physical hardware machine. Specifically, a virtual machine provides an interface between application programs and the physical hardware, potentially allowing application programs tied to a specific instruction set architecture (ISA) to execute on hardware implementing a different instruction set architecture. Virtualization is beneficial in the various aspects because application programs are typically distributed as compiled binary files that are tied to a specific instruction set architecture and depend upon a specific operating system interface (OSI). Without the assistance of virtual machines, compiled binary files may only be executed on systems that support the specific instruction set architecture (e.g., Intel IA-32, etc.) and operating system interface for which the binary code was compiled. Virtual machines can be leveraged to circumvent these limitations by adding a layer of software that supports the architectural requirements of the application program and/or translates the application program's instruction set architecture into the instruction set architecture supported by the hardware.

FIG. 1 illustrates a layered architectural diagram of a processor showing logical components and interfaces in a typical computer system suitable for implementing the various aspects. The illustrated computer system architecture 100 includes both hardware components and software components. The hardware components may include execution hardware (e.g., an application processor, digital signal processor, etc.) 102, input/output devices 106, and one or more memories 104. The software components may include an operating system 108, a library module 110, and one or more application programs 112.

The application programs 112 use an application program interface (API) to issue high-level language (HLL) library calls to the library module 110. The library module 110 uses an application binary interface (ABI) to invoke services (e.g., via operating system calls) on the operating system 108. The operating system 108 communicates with the hardware components using a specific instruction set architecture (ISA), which is a listing of specific operation codes (opcode) and native commands implemented by the execution hardware 102.

The application binary interface defines the machine as seen by the application program processes, whereas the application program interface specifies the machine's characteristics as seen by a high-level language program. The ISA defines the machine as seen by the operating system.

Figure 2A:
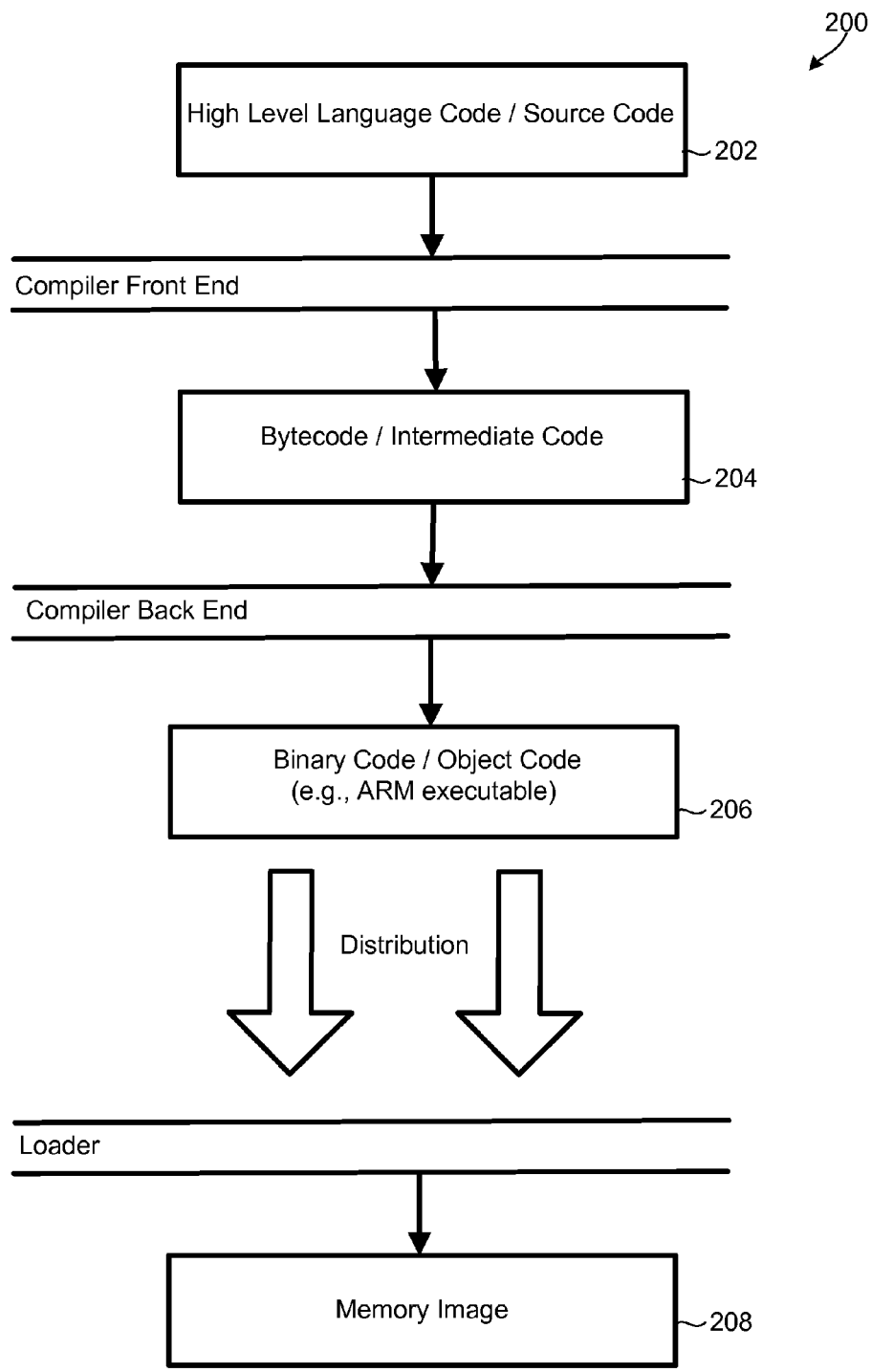
FIGS. 2A and 2B are process flow diagrams illustrating logical components and code transformations for distributing code in a format suitable for implementing the various aspects.
Figure 2B:
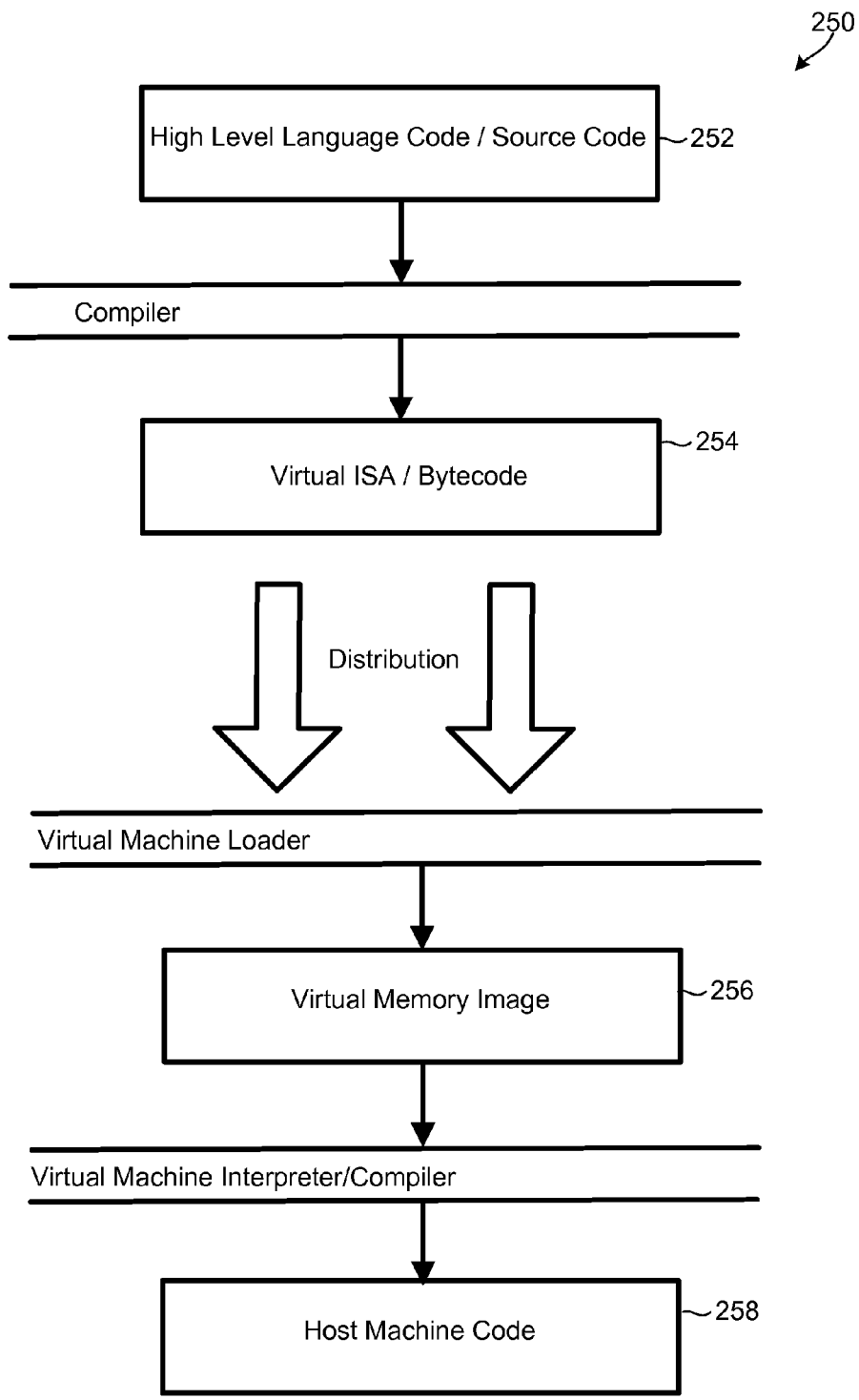

FIGS. 2A and 2B are process flow diagrams illustrating the conversion of the software applications written in a high level language (e.g., Java, C++, etc.) into distributable code. As mentioned above, mobile device application programs are typically distributed as compiled binary files (referred to as "object code") that are tied to a specific ISA and operating system interface (OSI).

FIG. 2A illustrates a method 200 for converting code from a high level language 202 to the distributable object code 206 for delivery to a mobile device. Application developers may write source code 202 using a high level language (Java, C++, etc.), which may be converted into object code 206 by a compiler. The compiler may be logically organized into a front-end component, a middle-end component, and a back-end component. The compiler front-end may receive the source code 202 and perform type checking operations, check the source code's syntax and semantics, and generate an intermediate representation 204 of the source code. The compiler middle-end may perform operations for optimizing the intermediate code 204, such as removing useless or unreachable code, relocating computations, etc. The compiler back-end may translate the optimized intermediate code 204 into binary/object code 206, which encodes the specific machine instructions that will be executed by a specific combination of hardware and OSI. The binary/object code 206 may then be distributed to devices supporting the specific combination of ISA and OSI for which the binary was generated, and may be stored in a physical memory and retrieved by a loader as a memory image 208.

FIG. 2B illustrates an aspect method 250 for converting code from a high level language 252 to the distributable code 256 for delivery to a mobile device having virtualization software. A compiler module may receive source code 252 written in a high level language and generate abstract machine code in a virtual instruction set architecture (Virtual ISA code) and/or bytecode 254 that specifies a virtual machine interface. The compiler module may generate the Virtual ISA code/bytecode 254 without performing any complex middle-end and back-end compiler processing that ties the code to a specific architecture or operating system. The generated virtual ISA code/bytecode 254 may be distributed to mobile devices having a wide variety of platforms and execution environments, so long as the mobile devices include virtualization software that supports the virtual ISA used to generate the Virtual ISA code/bytecode 254.

A computing device having virtualization software installed may receive the distribution code 254 and store the received code in memory. The virtualization software may include an interpreter/compiler for translating the virtual ISA instructions into the actual ISA instructions used by the underlying hardware. A virtual machine loader may load a virtual memory image 254 of the received code and pass the received code on to the virtual machine interpreter/compiler, which may interpret the virtual memory image and/or compile the virtual ISA code contained thereon, to generate host machine code 258 for direct execution on the host platform.

The compilation of the code may be performed in two steps, one before distribution and one after distribution. This allows the software applications to be easily ported to any computing device having virtualization software that supports the virtual ISA used by the first compiler, regardless of the device's underlying hardware and operating system interface. Moreover, the virtual machine compiler may be configured to process the code considerably faster than the full compiler, because the virtual machine compiler needs only to convert the virtual ISA to the host machine instructions.

Thus, in method 200 illustrated in FIG. 2A the code is distributed as machine/object code (e.g., ARM executable), whereas in the aspect method 250 illustrated in FIG. 2B, the code is distributed as abstract machine code/bytecode (e.g., Dalvik bytecode). In either case, a static optimizer may optimize the code before distribution (e.g., during compilation). However, the specific characteristics of the hardware on which the code is to be executed is not available to the static optimizer, and generally cannot be known until runtime. For this reason, static optimizers generally use generic optimization routines that optimize the code to run more efficiently (i.e., faster) on a wide variety of platforms and execution environments. These generic optimization routines cannot take into consideration the specific characteristics of the individual hardware on which the code is executed, such as the power consumption characteristics of a specific processor. The various aspects use virtualization techniques to optimize the code at runtime, using the specific characteristics of the hardware on which the code is to be executed to reduce the amount of energy required to execute the code.

Figure 3A:
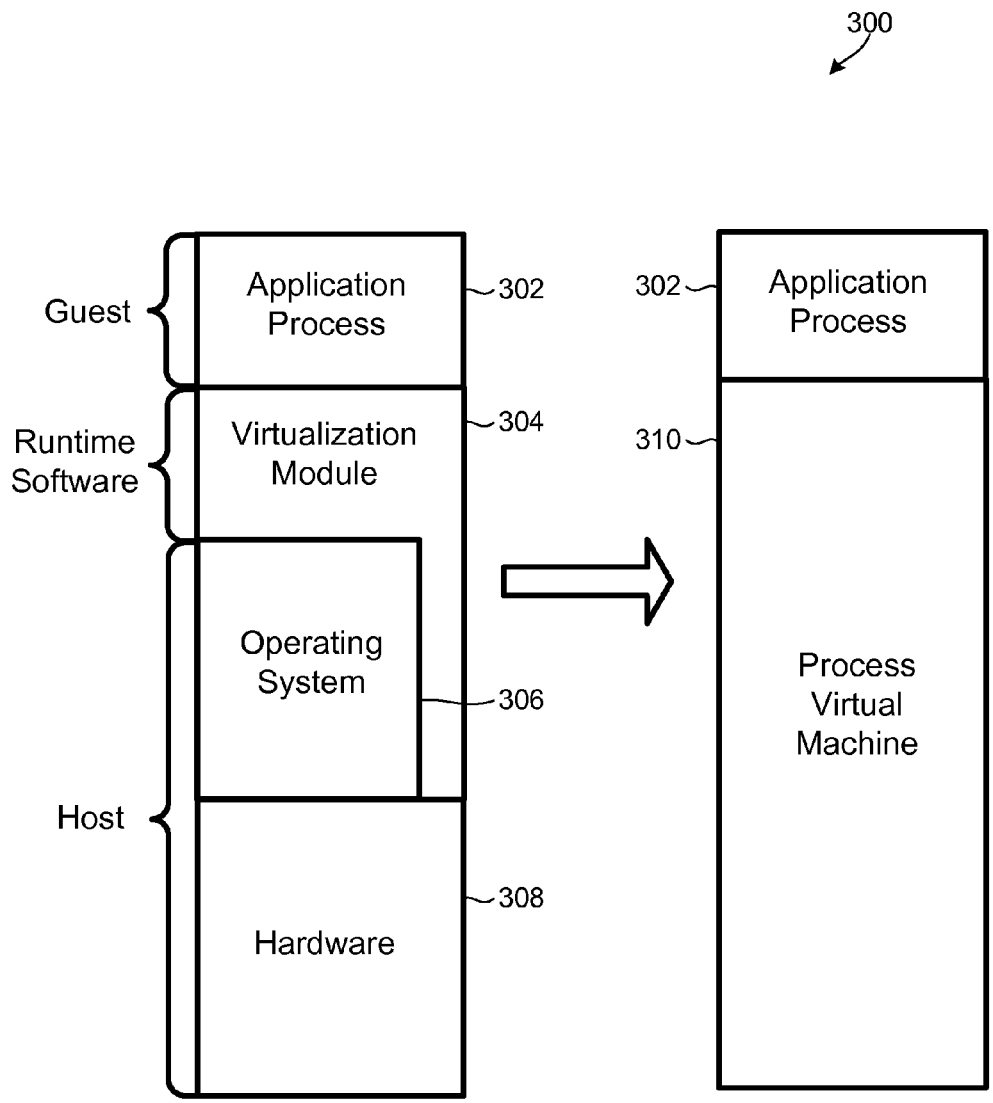
FIGS. 3A and 3B are layered computer architectural diagrams illustrating logical components in virtual machines suitable for implementing the various aspects.
Figure 3B:
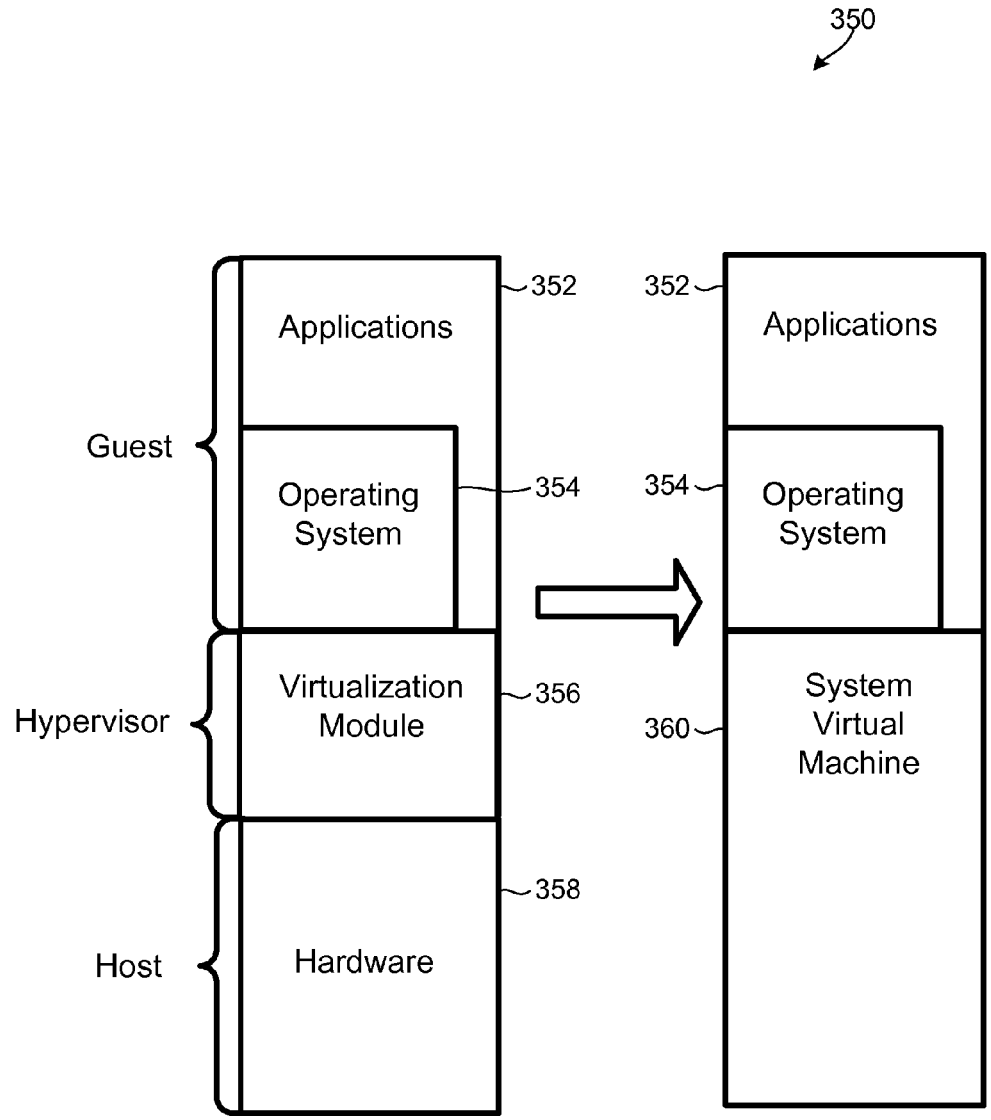

FIGS. 3A and 3B illustrate the logical components in a typical computer system implementing a virtual machine. As discussed above, virtual machines allow application programs tied to a specific ISA to execute on hardware implementing a different instruction set architecture. These virtual machines may be categorized into two general categories: system virtual machines and process virtual machines. System virtual machines allow the sharing of the underlying physical hardware between different processes or applications, whereas process virtual machines support a single process or application.

FIG. 3A is a layered architectural diagram illustrating logical layers of a computing device 300 implementing a process virtual machine 310. The computer system 300 may include hardware 308 components (e.g., execution hardware, memory, I/O devices, etc.), and software components that include a virtualization module 304, an operating system 306, and an application module 302.

As discussed above with reference to FIG. 1, hardware components are only visible to the application programs through the operating system, and the ABI and API effectively define the hardware features available to the application program. The virtualization software module 304 performs logical operations at the ABI/API level and emulates operating system calls and/or library calls, such that the application process 302 communicates with the virtualization software module 304 in the same manner it would otherwise communicate with hardware components (i.e., via system/library calls). In this manner, the application process 302 views the combination of the virtualization module 304, operating system 306 and hardware 308 as a single machine, such as the process virtual machine 310 illustrated in FIG. 3A.

As mentioned above, the process virtual machine 310 exists solely to support a single application process 302. The process virtual machine 310 is created with the process 302 and terminated when the process 302 finishes execution. The process 302 that runs on the virtual machine 310 is called "guest" and the underlying platform is called "host." Virtualization software 304 that implements the process virtual machine is typically called runtime software (or simply "runtime").

As an example, Dalvik is a process virtual machine (VM) on the Google™ Android operating system. The Android operating system converts Dalvik bytecode to ARM executable object code prior to execution. However, the power consumption characteristics of the hardware are not taken into consideration when generating the ARM object code. Moreover, since the process virtual machine 310 is created with the process 302 and terminated when the process 302 finishes, information about the execution of the process 302 cannot be used to optimize other concurrent processes.

FIG. 3B is a layered architectural diagram illustrating the logical layers in a computing device 350 implementing a system virtual machine 360. The computer system may include hardware 358 components (e.g., execution hardware, memory, I/O devices, etc.) and software components that include a virtualization module 356, an operating system 354, and an application programs module 352. Software that runs on top of the virtualization module 356 is referred to as "guest" software and the underlying platform that supports the virtualization module is referred to as "host" hardware.

The virtualization software module 356 may be logically situated between the host hardware and the guest software. The virtualization software may run on the actual hardware (native) or on top of an operating system (hosted), and is typically referred to as a "hypervisor" or virtual machine monitor (VMM). The hypervisor provides the guest software with virtualized hardware resources and/or emulates the hardware ISA, such that the guest software can execute a different ISA than the ISA implemented on the host hardware.

Unlike process virtual machines, a system virtual machine 360 provides a complete environment on which the multiple operating systems can coexist. Likewise, the host hardware platform may be configured to simultaneously support multiple, isolated guest operating system environments. The isolation between the concurrently executing operating systems adds a level of security to the system. For example, if security on one guest operating system is breached, or if one guest operating system suffers a failure, the software running on other guest systems is not affected by the breach/failure. Moreover, the system virtual machine may use information gained from the execution of one process to optimize other concurrent processes.

As mentioned above, virtualization software may run on the actual hardware (native) or on top of an operating system (hosted). In native configurations, the virtualization software runs in the highest privilege mode available, and the guest operating systems runs with reduced privileges, such that the virtualization software can intercept and emulate all guest operating system actions that would normally access or manipulate the hardware resources. In hosted configurations, the virtualization software runs on top of an existing host operating system, and may rely on the host operating system to provide device drivers and other lower-level services. In either case, each of the guest operating systems (e.g., operating system 354) communicates with the virtualization software module 356 in the same manner they would communicate with the physical hardware 358. This allows each guest operating system (e.g., operating system 354) to view the combination of the virtualization module 356 and hardware 358 as a single, virtual machine, such as the system virtual machine 360 illustrated in FIG. 3B.

The guest hardware may be emulated through interpretation, dynamic binary translation (DBT), or a combination thereof. In interpretation configurations, the virtual machine includes an interpreter that fetches, decodes, and emulates the execution of individual guest instructions. In dynamic binary translation configurations, the virtual machine includes a dynamic binary translator that converts guest instructions written in a first ISA into host instructions written in a second ISA. The dynamic binary translator may translate the guest instructions in groups or blocks (as opposed to instruction-by-instruction), which may be saved in a software cache and reused. This allows repeated executions of previously translated instructions to be performed without retranslating the code, which improves efficiency and reduces processing overhead.

As discussed above, dynamic binary translators convert guest instructions written in a first ISA (e.g., virtual ISA, SPARC, etc) into host instructions written in a second ISA (e.g., ARM, etc.). In the various aspects, the dynamic binary translator 414 may be configured to convert guest instructions written in a first ISA (e.g., ARM) into host instructions written in the same ISA (e.g., ARM). In the various aspects, as part of this translation process, the dynamic binary translator 414 may perform one or more code optimization procedures to optimize the performance of the binary code based on a model of the amount of power consumed at runtime by a specific piece of hardware in performing a particular segment or sequence of code. In this processing, the dynamic binary translator 414 may determine those machine operations which consume the most power (e.g., multiply operations), determine if there are alternative machine operations that achieve the same results (e.g., shift-and-add), and perform the translation operations such that the translated code is optimized for power consumption (e.g., replacing all multiply operations with shift-and-add operations, etc.). In an aspect, the dynamic binary translator 414 may optimize the code by performing an instruction-sequence to instruction-sequence translation of object code written in a first ISA (e.g., ARM) into object code written in the same ISA (e.g., ARM).

Figure 4:
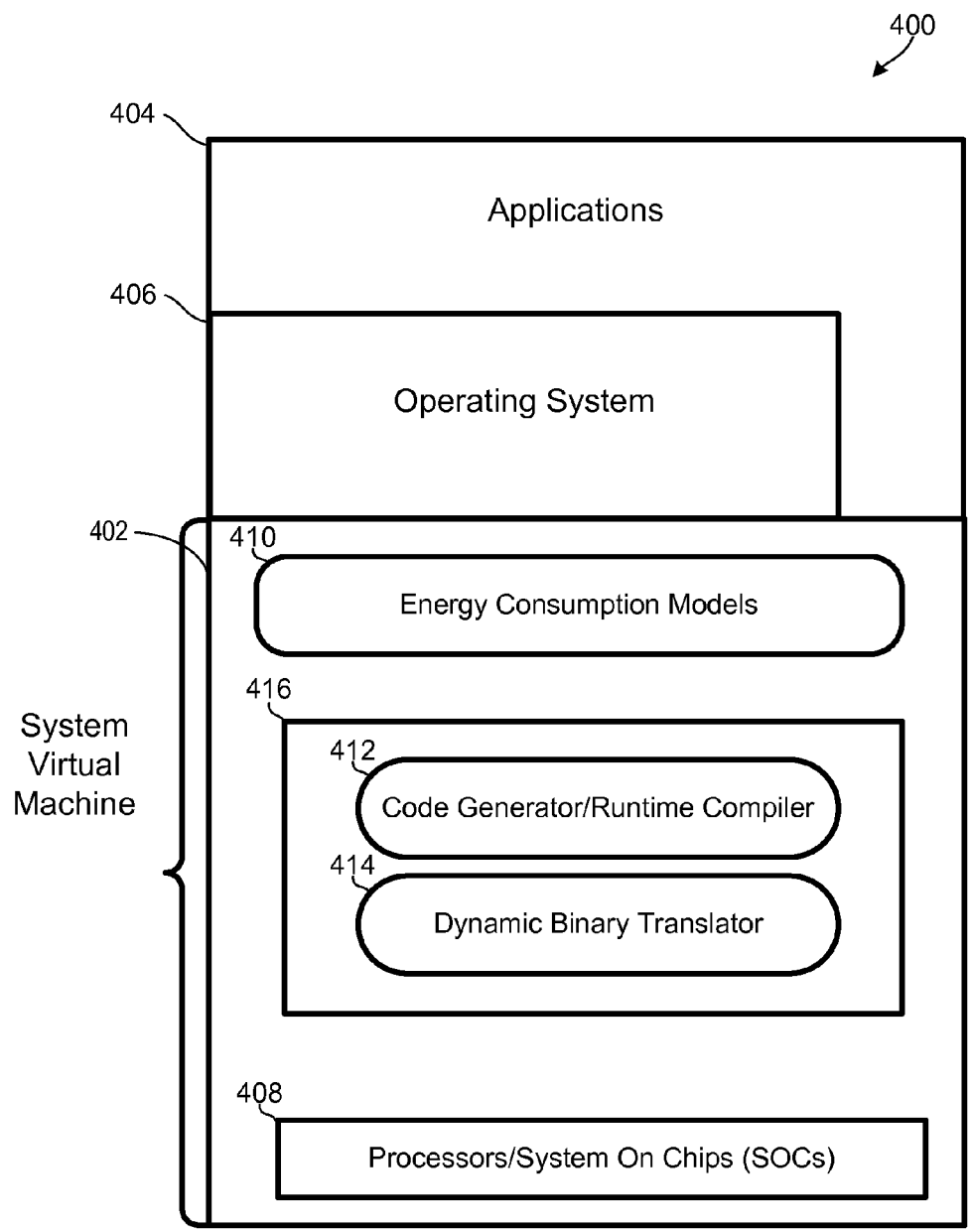
FIG. 4 is a component block diagram illustrating logical components and data flows of system virtual machine in accordance with an aspect.

FIG. 4 is a component diagram illustrating the logical components in a computer device 400 implementing a system virtual machine 402 configured to optimize the power behavior of applications 404 at runtime in accordance with the various aspects. The system virtual machine 402 may operate at the hypervisor level, beneath the operating system 406, and include one or more models of the energy consumption 410. The system virtual machine 402 may also include a dynamic code generator/runtime compiler 412 configured to generate and/or select one or more optimization procedures specifically tailored to the execution characteristics of a specific application program. The system virtual machine may also include a dynamic binary translator 414 configured to translate the object code into power optimized object code, tailoring application programs to the exact hardware on which the applications execute. In an aspect, the code generator/runtime compiler 412 and the dynamic binary translator 414 may be implemented as a single compiler unit 416. In an aspect, the system virtual machine may be configured such that the compiler unit 416 operates on object code (as opposed to source code) and generates new object code optimized for power efficiency (versus for performance/speed).

The power consumption characteristics of processors may depend both on the type of hardware and on how the hardware processes the specific object code. For example, the amount of power consumed to accomplish a given processing task may vary from one type of device to another, depending upon their architectures. Moreover, the power consumption characteristics of the same type of processor can vary from lot-to-lot and chip-to-chip, in some cases up to thirty percent. Due to these variances, application developers cannot write source code optimized to a particular device or a particular set of devices, as such information is generally not available until runtime.

In an aspect, the system virtual machine 402 compiler may be configured to optimize the code at runtime, based on the actual power consumption characteristics of the hardware. The virtual machine 402 may operate at the machine layer (as opposed to the language layer), further enabling the dynamic binary translator 414 to perform optimization procedures that optimize for power efficiency, rather than or in addition to optimizing for processing speed. In an aspect, the compiler unit 416 may use one or more compiler optimization routines to improve energy utilization based on the runtime performance of executing code.

In an aspect, the dynamic binary translator 414 may use profile information collected during interpretation and/or translation to optimize the binary code during execution. In addition, the dynamic binary translator 414 may use power consumption information collected at runtime to modify the optimization procedures, which may be used by the dynamic binary translator 414 and/or code generator 412 to optimize future translations and/or generate re-optimized versions of the current translation. As the dynamic binary translator 414 pulls profiling data, the code generator 412 may generate tags that allow the virtual machine to associate the profiling data with a particular chunk of code. In an aspect, the dynamic binary translator 414 may use profiling parameters and generated tags to measure the amount of energy required to execute a specific chunk of code on a specific piece of hardware, and adjust the optimization procedures based on the actual power characteristics of the specific hardware.

The virtual machine 402 may maintain an inventory of available processor cores and/or processors, which may include one or more systems on chips (SOCs). The term "system on chip" (SOC) is used to refer to a single integrated circuit (IC) chip that contains multiple resources and processors integrated on a single substrate. The energy consumption models 410 may include a data-structure (e.g., list, array, table, map, etc.) used to store information for monitoring each unit of object code being processed on the different cores/processors, and the amount of power necessary to process each unit of object code on a specific core/processor or identify alternative, more energy efficient processors. The code generator may perform binary-to-binary translation operations based on the energy consumption models to generate power optimized code.

In various aspects energy consumption models 410 may be supplied by the virtual machine authors, the authors of the application programs, and/or constructed by the virtual machine 402 at runtime using a machine learning procedure. The machine learning procedure may be generated and/or updated as the mobile device runs and executes object code. For example, the virtual machine 402 may be configured to construct the energy consumption models 410 based on information collected from previous executions of similar code, by using machine learning techniques and empirical data.

Figure 5:
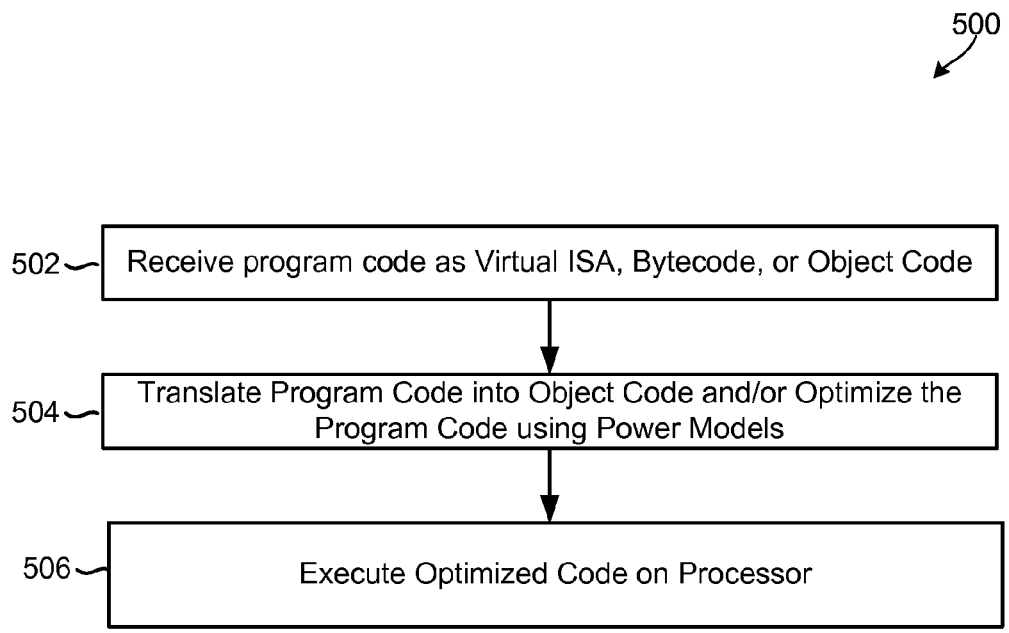
FIG. 5 is a process flow diagram illustrating an aspect method for generating optimized object code.

FIG. 5 illustrates an aspect method 500 of optimizing object code at runtime for improved power consumption. As mentioned above, mobile device application programs are typically distributed as compiled binary files that are tied to a specific instruction set architecture (ISA) and depend on a specific operating system interface (OSI). In block 502, the mobile device may receive a compiled binary code file, in a virtual ISA/bytecode (e.g., Dalvik), or as object code (e.g., ARM executable). The compiled binary file may be received by a mobile device operating system and provided to a system virtual machine operating at the mobile device's machine layer. In block 504, the virtual machine may compile/translate the code and/or generate optimized object code by applying one or more energy consumption models to the code, which may be used by the virtual machine to determine how the object code will be executed by the hardware and/or to recognize patterns or segments within the object code that should be translated into a power-optimized alternative sequence of operations. For example, the virtual machine may use the energy consumption models to identify operators in the code (e.g., multiply operations) that consume an excessive amount of energy, identify suitable alternative operations (e.g., shift-and-add operations) to the identified operators, and perform a binary-to-binary translation of the object code to generate optimized object code. The translated code may be saved as it is generated so that the next execution of the application does not require repeating the processes of analyzing and optimizing the code. In block 506, the optimized code may be loaded onto the hardware and executed on a processor/core.

In an aspect, the virtual machine may continuously update the energy consumption models and regenerate the object code based upon measurements of the actual power consumed by previous executions of optimized object code. In this manner, the actual performance of the mobile device processors may be used to optimize the object code, rather than relying upon a fixed model that may not reflect lot-to-lot variability in processor performance.

Figure 6:
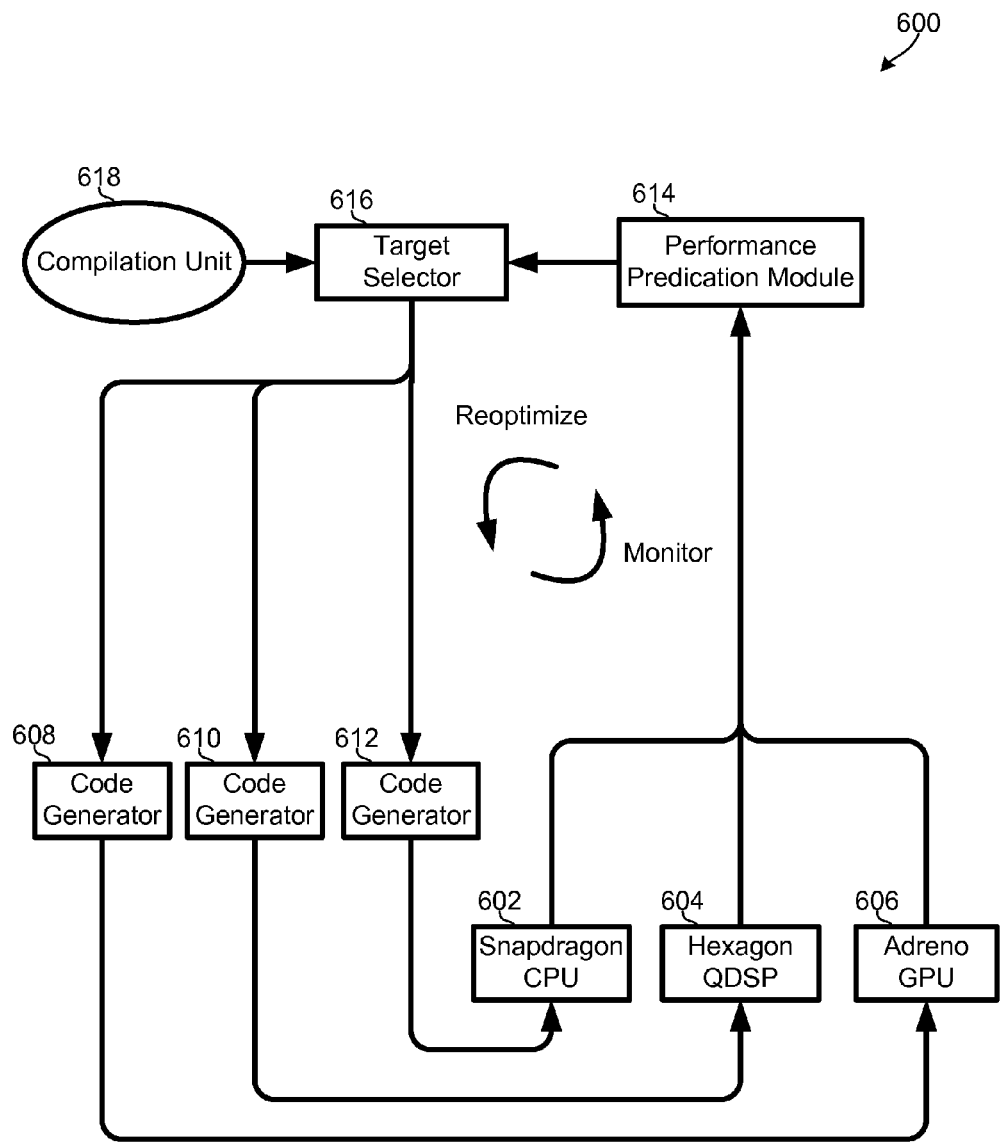
FIG. 6 is a component flow diagram illustrating logical components and data flows for measuring the power consumption characteristics of executing code to continuously re-optimize the generated object code in accordance with an aspect method.

FIG. 6 is a component/process flow diagram illustrating example logical components and data flows in a computing device configured to perform an aspect method 600 of continuously updating the energy consumption models and regenerating the object code. As mentioned above, the virtual machine may be implemented on a mobile computing device having multiple cores and/or processors, which may include one or more system on chips (SOCs). In the example illustrated in FIG. 6, the mobile computing device includes a central processor unit 602, a Hexagon QDSP core 604, and a graphics processing unit (GPU) 606. Each of these processors may be instrumented to measure the power consumed during execution of the generated object code.

A compilation unit 618 may generate compiler intermediate representation chunks and send the code chunks to a target selector 616. The target selector 616 may monitor the availability of the processors and select the most suitable processor for executing a segment of code (e.g., least-utilized processor, processor requiring the least amount of power, etc.). The target selector 616 may send a code chunk to a code generator module 608, 610, 612, which may receive the code chunk, and perform an instruction-sequence to instruction-sequence translation of the code to optimize the code for the selected core/processor 602, 604, 606. The optimized code may then be loaded onto the selected core/processor 602, 604, 606 for execution.

During execution, information may be collected on the amount of power consumed by each processor in processing each code chunk. The executed code chunks may be tagged and/or annotated with the collected power consumption information. The measured power consumption information may be sent to a performance prediction module 614, which compares the measured consumption information with a performance prediction model. Results of the comparison between the actual power consumption model and the predicted performance model may be fed back to the target selector 616. The target selector 616 may use the comparison results to update the power consumption models and optimization procedures, such that the power consumption characteristics of subsequently generated object code chunks are improved.

Various aspects may use the sum of the power savings and the energy cost of performing the compile/translate and optimization operations to determine a power function. The power function may be used to determine the net power savings associated with each power model and/or to determine whether the optimizations should be performed. For example, the power function may be used to determine if the amount of energy required to perform an optimization exceeds the amount of energy saved by the optimization, in which case the performance of the optimization may be cancelled or delayed.

In an aspect, the system virtual machine may calculate power savings based on power consumption values collected at runtime. The system virtual machine may periodically update the power consumptions models and re-generate the code chunks based on a combination of measured power consumption characteristics and calculated power savings. Power savings may be calculated using a linear polynomial function, or as the amount of power saved over a calculated time frame, offset by the amount of work required to perform the compile/translate, and optimization operations.

In an aspect, the hardware may be instrumented with additional circuitry to measure the power consumption characteristics of executing code. The system virtual machine may be configured to read the measurements made by the additional circuitry, and to use the measured power consumption characteristics to perform optimization procedures.

Figure 7:
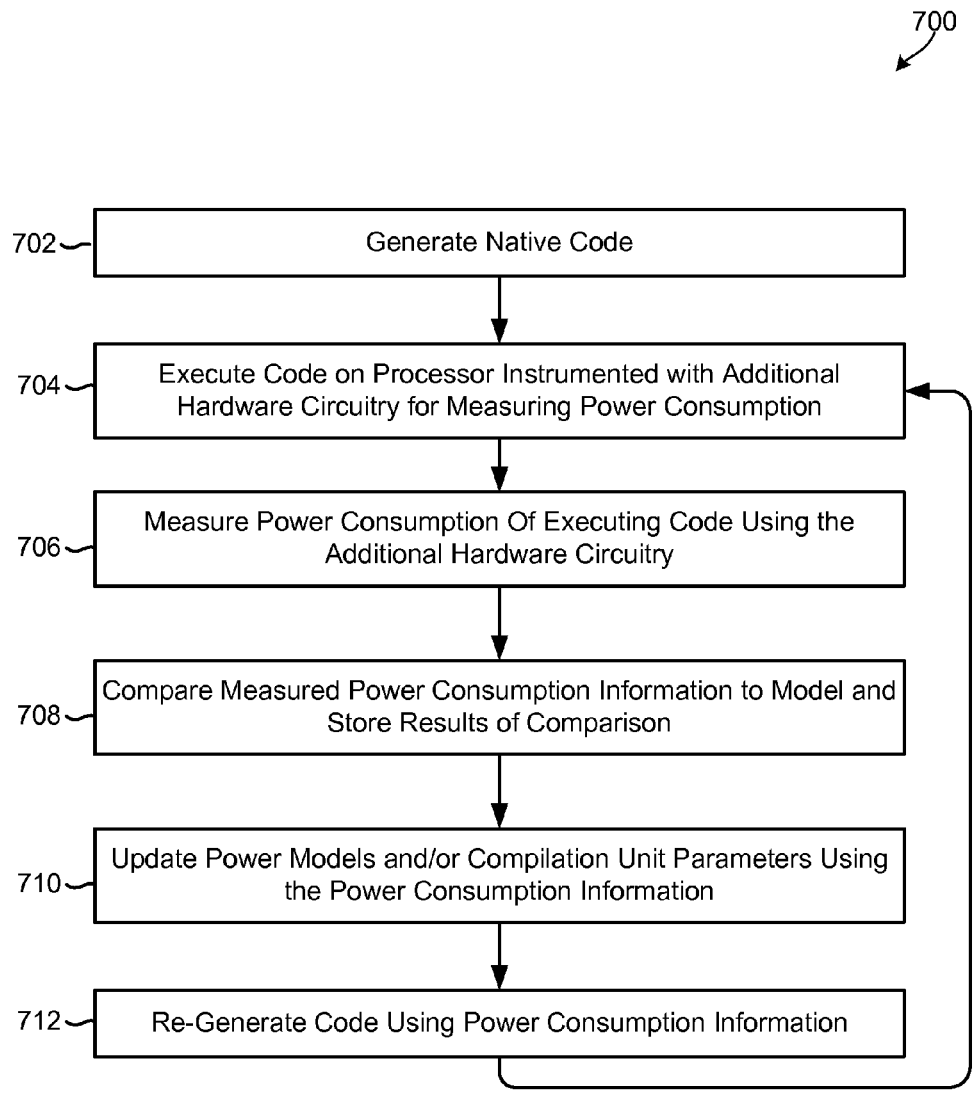
FIG. 7 is a process flow diagram illustrating an aspect method for measuring the power consumption characteristics of executing code and continuously re-optimize the object code.

FIG. 7 illustrates an aspect method 700 for updating the energy consumption models and continuously re-optimizing the object code at runtime. In block 702, the virtual machine compilation unit may generate native object code units for execution on one or more processors. The object code units may be tagged and/or annotated when they are optimized and/or transformed. The tags/annotations may be used by the virtual machine to track the amount of power consumed by each code unit. In block 704, the virtual machine may execute one or more of the generated code units on a processor instrumented with additional circuitry to measure the power consumption characteristics of executing the code units. In block 706, power consumption information may be collected from the processor. In block 708, the measured power consumption information may be compared with a performance prediction model, and the results of the comparison between the actual power consumption and the predicted performance may be stored in a memory. In block 710, the stored results may be used to update the performance models and/or power models used by the virtual machine compilation unit to generate native object code units. In block 712, the virtual machine compilation unit may re-generate previously optimized object code or code segments that have not yet been executed, and execute the regenerated code in block 704. In this manner, comparisons between the actual power consumption and the predicted performance may be fed back to the compilation unit so that better optimization methods can be identified and used for subsequent object code optimizations.

The comparisons may also be used to identify previous optimization procedures that resulted in higher, rather than lower, power consumption. For example, the virtual machine may execute an optimized code unit on a processor instrumented with the additional circuitry to measure the power consumption, measure the actual amount of power consumed by the optimized code, and if the actual amount of power consumed exceeds the amount of power consumed by the original code, back off on performing similar transforms on other units of code. In this manner, the virtual machine may be configured to learn over time which binary transforms are effective on a specific unit of hardware and which transforms are not, and make adjustments to the models as necessary.

In the various aspects, a variety of feedback and machine learning techniques may be used. Code optimization rule sets may be changed or updated when the measured results depart from the predicted model. Machine perturb and test method experiments may be performed, such as by changing an optimization rule, comparing the measured power consumption of the optimized code before and after the change to the optimization rule, and selecting for use the optimization rule that renders the best results. In an aspect, the power performance of different lengths of optimized code may be compared to one another to recognize patterns to enable better optimization to occur.

The feedback and learning mechanisms present a number of advantages. For example, the mobile device developer is not required to generate the device-specific model of power consumption because the models are automatically generated by the mobile device itself through machine learning, which simplifies device development. As another example, the feedback and learning mechanisms allow the various aspects to accommodate for changes in hardware that occur after the initial design is set (e.g., addition of new memory, substitution of a processor, etc.) after the model is designed. The feedback and learning mechanisms also allows the various aspects to better account for lot-to-lot and line-to-line variability in processor power consumption characteristics, which can vary by up to twenty percent. For example, while some of the chips made in a particular die may benefit from optimizing object code in a particular manner (e.g., using shift and add operations instead of multiplication operations), a few may actually experience higher power consumption from the same optimization due to the lot-to-lot and line-to-line variability. The various aspects may account for such variability by optimizing code based on the individual characteristics of the chip/hardware.

As mentioned above, various aspects may use the sum of the power savings and the energy cost of performing the compile/translate and optimization operations to determine a power function, which may be used to determine whether the optimizations should be performed. For example, the power function may be used to determine if the amount of energy required to perform the optimization exceeds the amount of energy saved by the optimization. In an aspect, models associated with optimization procedures that require more energy to perform than the amount of energy conserved by the optimized code may be stored in a memory, and performed when the computing device is not running on battery power.

Figure 8:
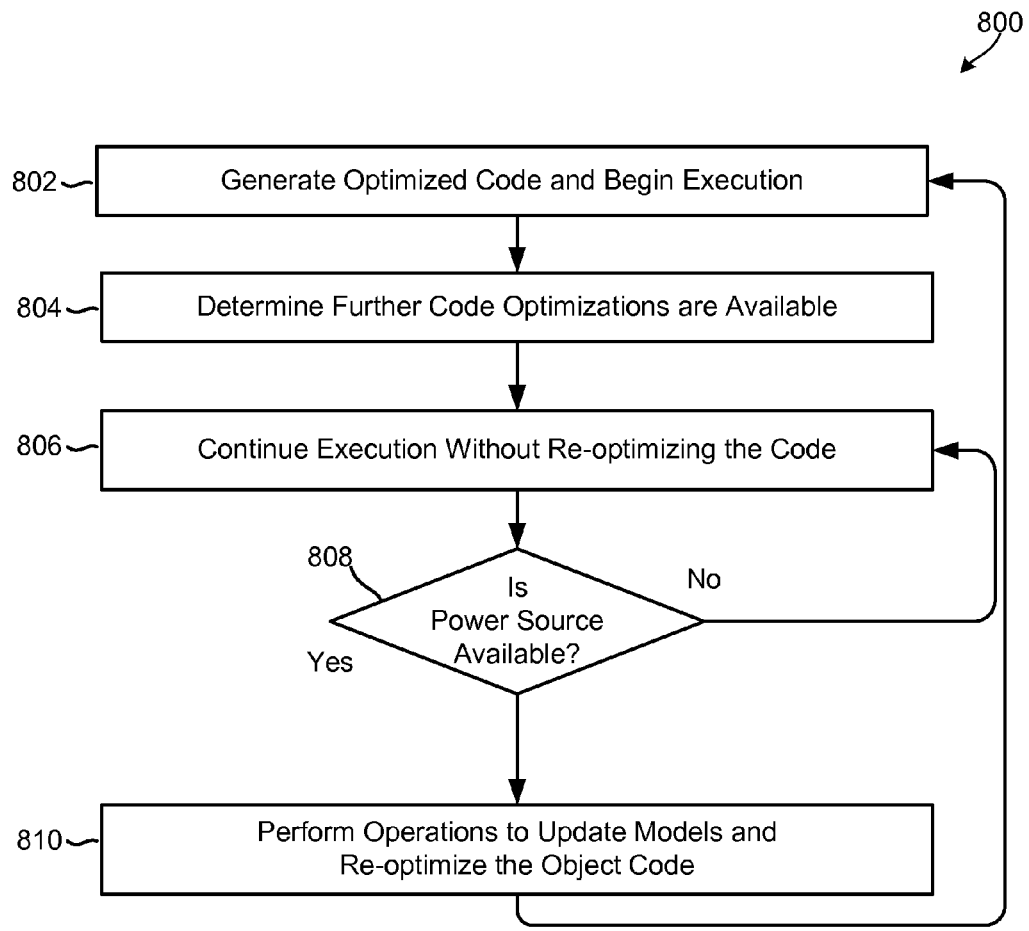
FIG. 8 is a process flow diagram illustrating an aspect method for performing object code optimizations after a connected power source has been detected.

FIG. 8 is a process flow diagram illustrating an aspect method 800 for performing the object code optimizations when the mobile device is plugged into a power source and is not running on battery power. In block 802, the virtual machine may generate the optimized object code units and begin execution, in accordance with any of the aspects discussed above. In block 804, the virtual machine may determine that further optimizations are available and store information pertaining to the available optimizations in a memory. In block 806, the virtual machine may continue the execution of the code without performing any of the identified optimizations. In determination block 808, the computing device may perform operations to determine if a new power source (e.g., a wired power connection) is available to the device. If a new power source is not available (determination block 808="No"), in block 806 the virtual machine may continue executing the code without performing any of the identified optimizations. If, on the other hand, the processor determines that a new power source is available (determination block 808="Yes"), in block 810 the virtual machine may retrieve the stored optimization information from memory and perform the optimizations (update the power models, re-generate object code, etc.) and store the optimized code in memory. In this manner, the optimization procedures may be performed only if the energy costs associated with performing the optimizations do not exceed the energy gains resulting from the optimizations.

In an aspect, the optimized object code resulting from the optimizations may be saved in memory and used for subsequent executions of the code. The optimizations may be performed in conjunction with a model of energy consumption that is specific to the particular hardware, which may be provided by the manufacture and/or learned by the mobile device during execution. In this manner, the various optimization procedures discussed above may be performed at runtime, before runtime, when the code is loaded, or the first time the process is executed. The various optimization procedures may be part of the runtime code generation process or part of the static code generation process.

It should be understood that, in the various aspects, performing optimizations when connected to power is not exclusive to performing optimizing at runtime. For example, the system virtual machine may perform optimizations as needed (e.g., during execution) or ahead of time (e.g., when connected to power and idle).

It should also be understood that the decisions regarding when to apply the optimization may be independent of the decisions regarding when to gather performance data. The various aspects may gather power consumption data during execution of the code and not act on the collected data until a condition is met (e.g., device is connected to power).

Figure 9:
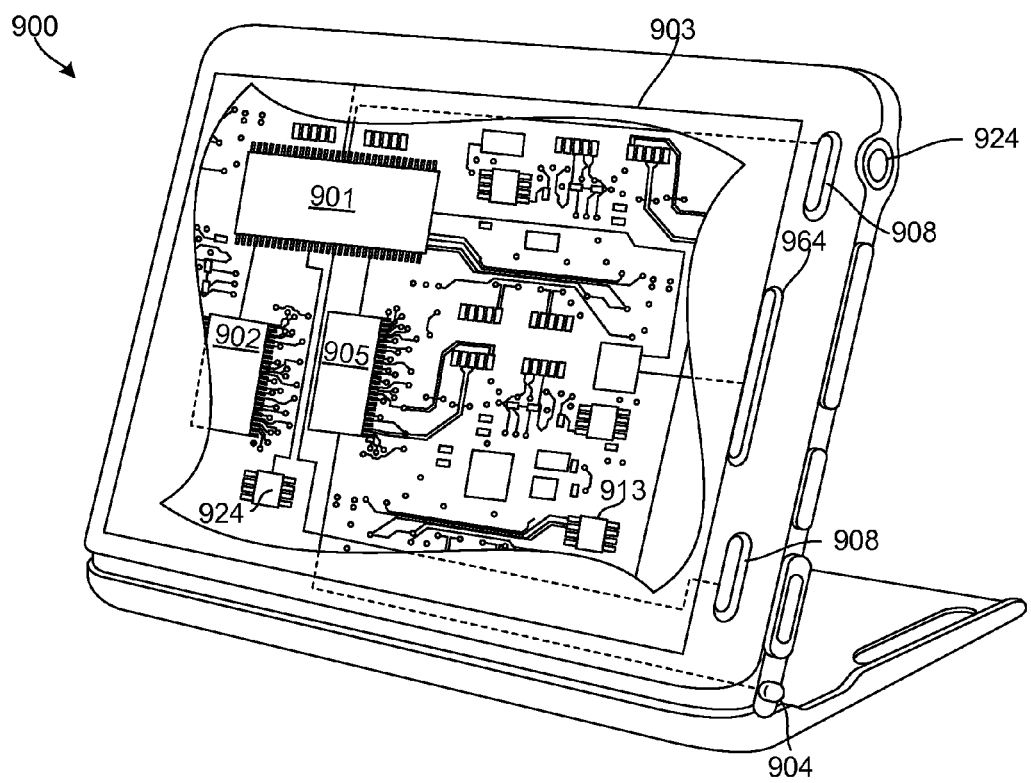
FIG. 9 is a component block diagram illustrating a mobile device suitable for implementing the various aspects.

Typical mobile devices 900 suitable for use with the various aspects will have in common the components illustrated in FIG. 9. For example, an exemplary mobile device 900 may include a processor 902 coupled to internal memory 901, a display 904, and to a speaker 964. Additionally, the mobile device may have an antenna 924 for sending and receiving electromagnetic radiation coupled to the processor 902. In some aspects, the mobile device 900 may include one or more specialized or general purpose processors 905, 924 which may include systems on chips. Mobile devices typically also include a key pad or miniature keyboard and menu selection buttons or rocker switches for receiving user inputs.

Figure 10:
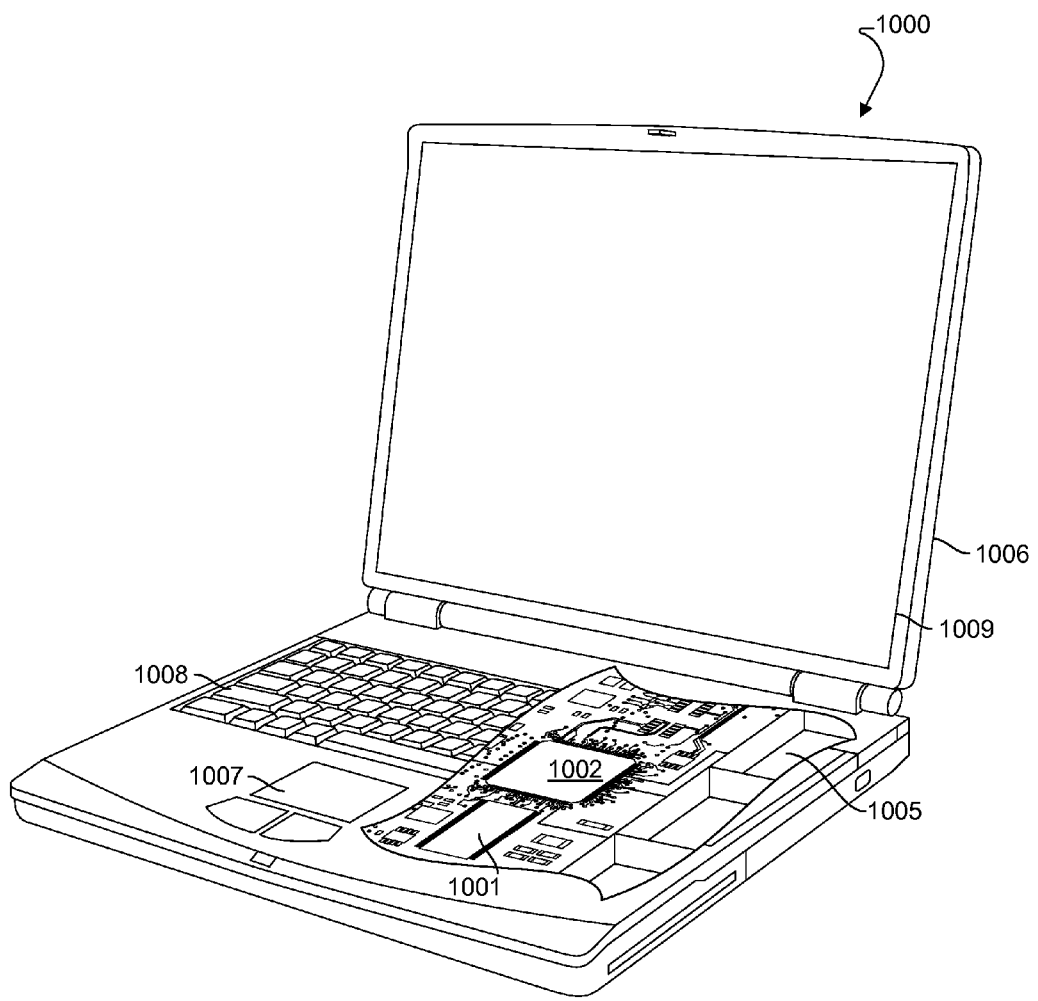
FIG. 10 is a component block diagram illustrating another mobile device suitable for implementing the various aspects.

FIG. 10 illustrates another exemplary mobile device 1000 suitable for use with the various aspects. For example, the mobile device 1000 may include a processor 1002 coupled to internal memory 1001, and a display 1009. Additionally, the mobile device may have a communication port 1005 for sending and receiving information. The mobile device 1000 may also include a keyboard 1008 and selection buttons 1007 for receiving user inputs.

The processors 902, 905, 924, 1002 may be any programmable microprocessor, microcomputer, or multiple processor chip or chips that can be configured by processor-executable software instructions (applications) to perform a variety of functions, including the functions of the various aspects described herein. Typically, software applications and processor-executable instructions may be stored in the internal memory 901, 1001 before they are accessed and loaded into the processors 902, 905, 924, 1002. In some mobile devices, the processors 902, 905, 924, 1002 may include internal memory sufficient to store the application software instructions. In some mobile devices, the secure memory may be in a separate memory chip coupled to the processor 902, 905, 924, 1002. In many mobile devices, the internal memory 901, 1001 may be a volatile or nonvolatile memory, such as flash memory, or a mixture of both. For the purposes of this description, a general reference to memory refers to all memory accessible by the processors 902, 905, 924, 1002 including internal memory, removable memory plugged into the mobile device, and memory within the processors.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), a DSP within a multimedia broadcast receiver chip, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for optimizing object code for power savings during execution on a computing device, comprising:
   receiving compiled binary object code in a computing device's system software;
   analyzing the received object code in a dynamic binary translator operating at the machine layer to identify code segments that can be optimized for power savings;
   sensing a change in a connection from an initial power source to a different power source;
   performing in the dynamic binary translator an instruction-sequence to instruction-sequence translation of the received object code to generate power optimized object code in response to sensing the change in the connection from the initial power source to the different power source; and
   executing the power optimized object code on a processor of the computing device.

2. The method of claim 1, wherein the system software which receives the compiled binary object code is one of a system virtual machine or a hypervisor.

3. The method of claim 1, wherein the system software which receives the compiled binary object code is an operating system.

4. The method of claim 1, wherein performing in the dynamic binary translator an instruction-sequence to instruction-sequence translation of the received object code to generate power optimized object code comprises translating a first instruction set architecture into a second instruction set architecture.

5. The method of claim 4, wherein the first instruction set architecture is the same instruction set architecture as the second instruction set architecture.

6. The method of claim 1, wherein analyzing the received object code in a dynamic binary translator operating at the machine layer to identify code segments that can be optimized for power savings comprises determining whether there are alternative operations that achieve the same results as the identified object code operations, and
   wherein performing in the dynamic binary translator an instruction-sequence to instruction-sequence translation of the received object code to generate power optimized object code comprises replacing, during translation, the identified object code operations with the alternative operations.

7. The method of claim 1, wherein analyzing the received object code comprises using a power consumption model to identify segments of object code that can be optimized for power efficiency.

8. The method of claim 7, further comprising: measuring an amount of power consumed in the execution of segments of power optimized object code; comparing the measured amount of power consumed to predictions of the power consumption model; and modifying the power consumption model based on a result of the comparison.

9. A computing device configured to optimize object code during execution for improved power savings, comprising:
   means for receiving compiled binary object code in system software;
   means for analyzing the received object code in a dynamic binary translator operating at the machine layer to identify code segments that can be optimized for power savings;
   means for sensing a change in a connection from an initial power source to a different power source;
   means for performing in the dynamic binary translator an instruction-sequence to instruction-sequence translation of the received object code to generate power optimized object code in response to sensing the change in the connection from the initial power source to the different power source; and means for executing the power optimized object code on a processor of the computing device.

10. The computing device of claim 9, wherein means for receiving compiled binary object code in system software comprises means receiving the compiled binary object code in one of a system virtual machine or a hypervisor.

11. The computing device of claim 9, wherein means for receiving compiled binary object code in system software comprises means receiving the compiled binary object code in an operating system.

12. The computing device of claim 9, wherein means for performing in the dynamic binary translator an instruction-sequence to instruction-sequence translation of the received object code to generate power optimized object code comprises means for translating a first instruction set architecture into a second instruction set architecture.

13. The computing device of claim 12, wherein means for translating a first instruction set architecture into a second instruction set architecture comprises means for translating the first instruction set architecture into an instruction set architecture that is the same as the second instruction set architecture.

14. The computing device of claim 9, wherein:
means for analyzing the received object code in a dynamic binary translator operating at the machine layer to identify code segments that can be optimized for power savings comprises means for determining whether there are alternative operations that achieve the same results as the identified object code operations; and
means for performing in the dynamic binary translator an instruction-sequence to instruction-sequence translation of the received object code to generate power optimized object code comprises means for replacing, during translation, the identified object code operations with the alternative operations.

15. The computing device of claim 9, wherein means for analyzing the received object code comprises means for using a power consumption model to identify segments of object code that can be optimized for power efficiency.

16. The computing device of claim 9, further comprising:
means for measuring an amount of power consumed in the execution of segments of power optimized object code;
means for comparing the measured amount of power consumed to predictions of the power consumption model; and
means for modifying the power consumption model based on a result of the comparison.

17. A computing device, comprising:
a memory; and
one or more processors coupled to the memory, wherein the one or more processors are configured with processor-executable instructions so the computing device performs operations comprising:
receiving compiled binary object code in system software;
analyzing the received object code in a dynamic binary translator operating at the machine layer to identify code segments that can be optimized for power savings;
sensing a change in a connection from an initial power source to a different power source;
performing in the dynamic binary translator an instruction-sequence to instruction-sequence translation of the received object code to generate power optimized object code in response to sensing the change in the connection from the initial power source to the different power source; and
executing the power optimized object code.

18. The computing device of claim 17, wherein the one or more processors are configured with processor-executable instructions so the computing device performs operations such that receiving compiled binary object code in system software comprises receiving the compiled binary object code in one of a system virtual machine or a hypervisor.

19. The computing device of claim 17, wherein the one or more processors are configured with processor-executable instructions so the computing device performs operations such that receiving compiled binary object code in system software comprises receiving the compiled binary object code in an operating system.

20. The computing device of claim 17, wherein the one or more processors are configured with processor-executable instructions so the computing device performs operations such that performing in the dynamic binary translator process an instruction-sequence to instruction-sequence translation of the received object code to generate power optimized object code comprises translating a first instruction set architecture into a second instruction set architecture.

21. The computing device of claim 20, wherein the one or more processors are configured with processor-executable instructions so the computing device performs operations such that the first instruction set architecture is the same as the second instruction set architecture.

22. The computing device of claim 17, wherein the one or more processors are configured with processor-executable instructions so the computing device performs operations such that:
analyzing the received object code in a dynamic binary translator operating at the machine layer to identify code segments that can be optimized for power savings comprises determining whether there are alternative operations that achieve the same results as the identified object code operations; and
performing in the dynamic binary translator an instruction-sequence to instruction-sequence translation of the received object code to generate power optimized object code comprises replacing, during translation, the identified object code operations with the alternative operations.

23. The computing device of claim 17, wherein the one or more processors are configured with processor-executable instructions so the computing device performs operations such that analyzing the received object code comprises using a power consumption model to identify segments of object code that can be optimized for power efficiency.

24. The computing device of claim 23, wherein the one or more processors are configured with processor-executable instructions so the computing device performs operations further comprising:
measuring an amount of power consumed in the execution of segments of power optimized object code;
comparing the measured amount of power consumed to predictions of the power consumption model; and
modifying the power consumption model based on a result of the comparison.

25. A non-transitory processor-readable storage medium having stored thereon processor-executable software instructions configured to cause a processor to perform operations for optimizing object code for power savings during execution on a computing device, the operations comprising:

receiving compiled binary object code in system software;

analyzing the received object code in a dynamic binary translator operating at the machine layer to identify code segments that can be optimized for power savings;

sensing a change in a connection from an initial power source to a different power source;

performing in the dynamic binary translator an instruction-sequence to instruction-sequence translation of the received object code to generate power optimized object code; and executing the power optimized object code on a processor of the computing device in response to sensing the change in the connection from the initial power source to the different power source.

26. The non-transitory processor-readable storage medium of claim 25, wherein the stored processor-executable software instructions are configured to cause a processor to perform operations such that receiving compiled binary object code in system software comprises receiving the compiled binary object code in one of a system virtual machine or a hypervisor.

27. The non-transitory processor-readable storage medium of claim 25, wherein the stored processor-executable software instructions are configured to cause a processor to perform operations such that receiving compiled binary object code in system software comprises receiving the compiled binary object code in an operating system.

28. The non-transitory processor-readable storage medium of claim 25, wherein the stored processor-executable software instructions are configured to cause a processor to perform operations such that performing in the dynamic binary translator an instruction-sequence to instruction-sequence translation of the received object code to generate power optimized object code comprises translating a first instruction set architecture into a second instruction set architecture.

29. The non-transitory processor-readable storage medium of claim 28, wherein the stored processor-executable software instructions are configured to cause a processor to perform operations such that the first instruction set architecture is the same as the second instruction set architecture.

30. The non-transitory processor-readable storage medium of claim 25, wherein the stored processor-executable software instructions are configured to cause a processor to perform operations such that:

analyzing the received object code in a dynamic binary translator process operating at the machine layer to identify code segments that can be optimized for power savings comprises determining whether there are alternative operations that achieve the same results as the identified object code operations;

and performing in the dynamic binary translator process an instruction-sequence to instruction-sequence translation of the received object code to generate power optimized object code comprises replacing, during translation, the identified object code operations with the alternative operations.

31. The non-transitory processor-readable storage medium of claim 25, wherein the stored processor-executable software instructions are configured to cause a processor to perform operations such that analyzing the received object code comprises using a power consumption model to identify segments of object code that can be optimized for power efficiency.

32. The non-transitory processor-readable storage medium of claim 31, wherein the stored processor-executable software instructions are configured to cause a processor to perform operations further comprising:

measuring an amount of power consumed in the execution of segments of power optimized object code;

comparing the measured amount of power consumed to predictions of the power consumption model; and modifying the power consumption model based on a result of the comparison.

33. A system on chip, comprising:

a memory; and one or more cores coupled to the memory, wherein the one or more cores are configured with processor-executable instructions so the system on chip performs operations comprising:

receiving in an operating system compiled binary object code;

analyzing the received object code in a dynamic binary translator process operating at the machine layer to identify code segments that can be optimized for power savings;

sensing a change in a connection from an initial power source to a different power source;

performing in the dynamic binary translator process an instruction-sequence to instruction-sequence translation of the received object code to generate power optimized object code in response to sensing the change in the connection from the initial power source to the different power source; and executing the power optimized object code.

34. The system on chip of claim 33, wherein the one or more cores are configured with processor-executable instructions so the system on chip performs operations such that performing in the dynamic binary translator process an instruction-sequence to instruction-sequence translation of the received object code to generate power optimized object code comprises translating a first instruction set architecture into a second instruction set architecture.

35. The system on chip of claim 34, wherein the one or more cores are configured with processor-executable instructions so the system on chip performs operations such that the first instruction set architecture is the same as the second instruction set architecture.

36. The system on chip of claim 33, wherein the one or more cores are configured with processor-executable instructions so the system on chip performs operations such that:

analyzing the received object code in a dynamic binary translator process operating at the machine layer to identify code segments that can be optimized for power savings comprises determining whether there are alternative operations that achieve the same results as the identified object code operations; and performing in the dynamic binary translator process an instruction-sequence to instruction-sequence translation of the received object code to generate power optimized object code comprises replacing, during translation, the identified object code operations with the alternative operations.

37. The system on chip of claim 33, wherein the one or more cores are configured with processor-executable instructions so the system on chip performs operations such that analyzing the received object code comprises using a power consumption model to identify segments of object code that can be optimized for power efficiency.

38. The system on chip of claim 37, wherein the one or more cores are configured with processor-executable instructions so the system on chip performs operations comprising:

measuring an amount of power consumed in the execution of segments of power optimized object code;

comparing the measured amount of power consumed to predictions of the power consumption model; and modifying the power consumption model based on a result of the comparison.

\* \* \* \* \*